ial aluminum oxide (140–200 mesh) was weighed into

United States Patent Office 2,783,185
Patented Feb. 26, 1957

2,783,185

OXIDATIVE REFORMING OF NAPHTHA

Everett C. Hughes, Shaker Heights, Harold A. Strecker, Bedford, and Arthur Letcher Jones, Lyndhurst, Ohio, assignors to The Standard Oil Company, Cleveland, Ohio, a corporation of Ohio No Drawing. Application September 28, 1953, Serial No. 382,847

4 Claims. (Cl. 196—50)

The present invention relates to a process for the reforming of naphtha by partial oxidation.

The petroleum industry has devised many processes for the reforming of naphtha, one type of which is classed as oxidative reforming. In general, oxidative reforming processes are characterized by the reforming of naphtha in the presence of oxygen or a substance capable of liberating oxygen. In one species of oxidative reforming, the naphtha is contacted with an oxygen-containing gas such as air at an elevated temperature. In another species of oxidative reforming, naphtha is contacted with a metallic oxide in the absence of any added quantities of air or an oxygen-containing gas under conditions which liberate oxygen from the metallic oxide. In the latter species of oxidative reforming the main reaction which occurs is one between the oxygen of the metal oxide and the naphtha although slight catalytic effects are also present. The oxidative reforming of naphtha using a solid oxygen carrier offers several advantages over oxidation in the presence of an oxygen-containing gas since the problem of separating the product from the reactants when both include fixed gases is eliminated and, in addition, the reaction occurs at a lower temperature, thereby eliminating side reactions such as cracking.

The present invention is concerned with the latter species of oxidative reforming, i. e., the reforming of naphtha in the absence of an oxygen-containing gas but in the presence of a metal oxide which will liberate oxygen under the conditions of the reaction.

In accordance with the present invention it has been found that the pentavalent oxides of arsenic and antimony, $As_2O_5$ and $Sb_2O_5$ respectively, when supported on a carrier such as, for example, silica or alumina are highly effective oxygen carriers for the oxidative reforming of naphtha. The process of the invention accordingly comprises the step of passing vaporized naphtha, in the absence of added oxygen, into contact at an elevated temperature with an oxygen carrier selected from the group consisting of the pentavalent oxides of arsenic and antimony supported on a high surface area carrier.

There are many variables in the process which influence the nature and the extent of the reforming reaction. One of these variables is the temperature. Generally speaking, the temperature employed in the present process will vary between about 500° and 800° F. and, within this temperature range, the optimum temperature to be employed will vary with the other reaction conditions such as the type of oxygen carrier that is employed and the nature of the naphtha charge. For example when operating with one oxygen carrier it may be found that the optimum temperature is close to 500° F. and when operating with another oxygen carrier it may be found that the optimum temperature is close to 800° F.

The oxygen carriers mentioned above are composed of from about 10% to about 50% of a pentavalent oxide of arsenic or antimony deposited on a high surface area support such as silica, alumina, kieselguhr, thoria, zirconia, and the like. These materials may be made by impregnating the desired support with a compound of arsenic or antimony which when decomposed will form a pentavalent oxide. Thus, for example, silica gel may be admixed with an aqueous solution of a compound such as arsenic acid or antimony pentachloride to form a slurry and the slurry may then be heated to dryness in the presence of air to form the corresponding oxide of antimony or arsenic.

When an oxygen carrier of the type described above is heated in the substantial absence of air but in the presence of vaporized naphtha, the pentavalent oxide is reduced to a lower oxide evolving oxygen in the process. The oxygen unites with the naphtha effecting a change by oxidation in the chemical structure of the naphtha. Following the reaction, the oxygen carrier can be regenerated by heating in the presence of air at approximately the same temperature, within 100° F., as that used in the reforming process.

In the present invention, the chemical equations involved in the reduction and regeneration of the oxygen carriers are as follows:

$$As_2O_5 \longleftrightarrow As_2O_3 + O_2$$
$$Sb_2O_5 \longleftrightarrow Sb_2O_3 + O_2$$

The actual mechanics of the process of the invention are conventional. Any of the various types of reactors which are utilized in the vapor phase processing of naphtha can be employed. Either a fixed bed reactor or a fluid type catalytic reactor are suitable but since fluidized reactions are generally advantageous, it is preferable to carry out the process under fluidized conditions.

Before proceeding to illustrate the invention by way of specific examples, the preparation of several oxygen carriers which can be utilized in the process of the invention will first be described.

PREPARATION A

One hundred and twenty (120) grams of a commercial aluminum oxide (140–200 mesh) was weighed into an evaporating dish and to this there was added a solution of 80 grams of arsenic pentoxide in 700 milliliters of distilled water. The addition of the arsenic pentoxide solution was periodic in 25 milliliter increments and the wet alumina was heated in air to dryness between additions. After all of the arsenic pentoxide solution had been added, the oxygen carrier was then heated for 10 hours at 1050° F. in the presence of air. In this preparation the oxygen carrier in its final form comprised 40% by weight of arsenic pentoxide and 60 parts by weight of alumina 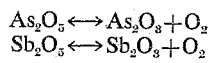.

PREPARATION B

The procedure of Preparation A was repeated using 42 grams of silica gel and 52 grams of antimony pentachloride, the antimony pentachloride being converted to antimony pentoxide during the process. A solid oxygen carrier composed of about 40% antimony pentoxide and 60% silica was recovered as before.

PREPARATION C

The procedure of Preparation A was repeated using 42 grams of aluminum oxide and 52 grams of antimony pentachloride. A solid oxygen carrier composed of about 40% antimony pentoxide and 60% alumina was recovered as before.

The oxidative reforming process of the present invention will be illustrated by the following examples.

*Examples 1 through 11*

The experiments of these examples were performed on a heavy naphtha which had the following properties:

TABLE I.—NAPHTHA INSPECTION

| | |
|---|---|
| Gravity, API | 51.0 |
| Sulfur, wt. percent | 0.068 |
| Olefins, percent | [1] 0 |
| Aromatics, percent | [1] 10 |
| Bromine No | 1.3±0.3 |
| Kattwinkel No | 15 |

[1] By silica gel adsorption.

Engler distn.:

| | |
|---|---|
| I. B. P., °F | 180 |
| 5 | 224 |
| 50 | 360 |
| 95 | 478 |
| E. P | 512 |

Micro Engler distn.:

| | |
|---|---|
| I. B. P., °F | 172±5 |
| 5 | 213±2 |
| 50 | 343±2 |
| 90 | 445±3 |
| E. P | 458±2 |

The apparatus employed in the example comprised a fluidixed reactor equipped with means for supplying vaporized naphtha and a gas to the reactor, means for heating the reactor and means for condensing the reaction products. The reactor was initially filled with 100 milliliters of one of the oxygen carriers of Preparation A through C. At the beginning of the reforming process, the temperature of the recator was adjusted to within plus or minus 5° F. of the desired temperature and was held at this temperature for a period of 10 minutes. In the operation of the apparatus, vaporized naphtha was admitted to the reactor at a rate of about 0.5 cubic feet per hour which rate was found to be sufficient to maintain the oxygen carrier in a fluidized state. The contact time between the oxygen carrier and the vaporized naphtha ranged from about 10 to about 15 seconds. The volume of naphtha used with each oxygen carrier was calculated on the basis of one mole of naphtha per gram atom of oxygen available, assuming complete reduction of the oxide in each case to the reduced from indicated hereinabove.

The oxidized naphtha from the reactor was collected in a liquid state in a cooled receiver and was analyzed for Bromine number and Kattwinkel number. The results of the several examples are tabulated in the following table:

TABLE II

| Example No. | Oxide | Support | Temp. (° F.) | Bromine No. | Kattwinkel No. |
|---|---|---|---|---|---|
| 1 | $As_2O_3$ | $Al_2O_3$ | 500 | 4.6 | 28 |
| 2 | | | 600 | 2.2 | 18 |
| 3 | | | 700 | 3.2 | 18 |
| 4 | | | 800 | 3.3 | 18 |
| 5 | $Sb_2O_5$ | $SiO_2$ | 600 | 2.1 | 19 |
| 6 | | | 700 | 2.2 | 25 |
| 7 | | | 800 | 3.7 | 19 |
| 8 | $Sb_2O_5$ | $Al_2O_3$ | 500 | 0.72 | 15 |
| 9 | | | 600 | 1.6 | 15 |
| 10 | | | 700 | 3.4 | 22 |
| 11 | | | 800 | 4.3 | 24 |

The Kattwinkel number of naphtha is the measure of the sum of the aromatics, olefins and oxygenated compounds present while the Bromine number is a measure of the percent olefinic material formed. By comparing the Kattwinkel and Bromine numbers of the initial charge stock with the Kattwinkel and Bromine numbers of the product, it is apparent that the process of the present invention results in the formulation of a significant amount of oxidized products, olefinic and aromatic compounds. As a result of these chemical changes in the charge stock, the octane properties, are considerably improved. If further improvement in the product is desired, the product may be treated further by contact with a bauxite catalyst by the so-called "Perco" process which results in the removal of the elements of water from the naphtha with the formation of increased amounts of unsaturated compounds, thus still further increasing the octane number of the product. The "Perco" process is further described in Petroleum Processing, vol. III, pages 133–138 (1948).

It is intended to cover all changes and modifications in the examples of the invention, herein given for purposes of disclosure, which do not constitute departure from the spirit and scope of the appended claims.

We claim:

1. A process for the oxidative reforming of naphtha, which comprises passing vaporized naphtha in the absence of an added oxygen-containing gas into contact with a reforming catalyst consisting of a compound selected from the group consisting of arsenic pentoxide and antimony pentoxide supported on a carrier material, at a temperature of from about 500 to 800° F., the amount of the naphtha being not in excess of about one mole of naphtha per gram atom of oxygen available upon reduction of the pentoxide to the trioxide, recovering naphtha having a higher Kattwinkel number, and regenerating the reforming catalyst by oxidation to convert the oxide to the pentoxide state.

2. A process according to claim 1 in which the reforming catalyst comprises arsenic pentoxide supported on alumina, and in which the reforming temperature is about 500° F.

3. A process according to claim 1 in which the reforming catalyst comprises antimony pentoxide supported on silica gel.

4. A process according to claim 1 in which the reforming catalyst comprises antimony pentoxide supported on alumina.

References Cited in the file of this patent

UNITED STATES PATENTS

| | | |
|---|---|---|
| 2,250,415 | Burk et al. | July 22, 1941 |
| 2,410,044 | Burk et al. | Oct. 29, 1946 |